US005880862A

United States Patent [19]

Hiraga et al.

[11] Patent Number: 5,880,862

[45] Date of Patent: Mar. 9, 1999

[54] OPTICAL COMPUTER

[75] Inventors: Takashi Hiraga; Tetsuo Moriya, both of Tsukuba; Norio Tanaka, Tokyo; Ichiro Ueno, Yokohama, all of Japan

[73] Assignees: Agency of Industrial Science and Technology; Japan Science and Technology Corporation; Daninichiseika Color & Chemicals MFG Co., Ltd.; Victor Company of Japan, Limited, all of, Japan

[21] Appl. No.: 761,347

[22] Filed: Dec. 6, 1996

[30] Foreign Application Priority Data

Dec. 25, 1995 [JP] Japan .................................... 7-336247

[51] Int. Cl.[6] ........................................ G02B 3/00

[52] U.S. Cl. ............................ 359/108; 359/244

[58] Field of Search ..................... 359/108, 107, 359/244

[56] References Cited

U.S. PATENT DOCUMENTS

| | | | |
|---|---|---|---|
| 4,948,959 | 8/1990 | Houk et al. | 250/578.1 |
| 5,109,456 | 4/1992 | Evans | 359/108 |
| 5,223,966 | 6/1993 | Tomita et al. | 359/108 |
| 5,268,785 | 12/1993 | Crenshaw et al. | 359/244 |
| 5,307,199 | 4/1994 | Urakami et al | 359/244 |
| 5,502,585 | 3/1996 | Quian | 359/108 |
| 5,618,654 | 4/1997 | Takei et al. | 359/244 |
| 5,625,484 | 4/1997 | Coutsomitros | 359/244 |
| 5,659,415 | 8/1997 | Staver et al. | 359/244 |
| 5,661,594 | 8/1997 | Rhoads et al. | 359/244 |

FOREIGN PATENT DOCUMENTS

| | | |
|---|---|---|
| 6-163885 | 6/1994 | Japan . |
| 6-306181 | 6/1994 | Japan . |
| 7-252671 | 7/1995 | Japan . |

*Primary Examiner*—Jon Henry
*Attorney, Agent, or Firm*—Lorusso & Loud

[57] ABSTRACT

An optical computer includes a plurality of functional elements (thin-film elements) each adapted for causing an external signal to act on a two-dimensional-information incident light so as to perform information processing, and light sources for transferring the two-dimensional-information incident light between the functional elements. Each of the functional elements includes nanoparticles comprising molecules of an organic compound and associates/aggregates of these molecules. This structure makes it possible to input light beams from a plurality of functional elements to a single functional element and to output light beams from this single functional element to the plurality of functional elements.

8 Claims, 4 Drawing Sheets

OPTICAL COMPUTER

BACKGROUND OF THE INVENTION

1. Field of the Invention

The present invention relates to an optical computer for optically processing information, and particularly to an optical computer composed of a thin-film element that contains nanoparticles comprising molecules of an organic compound and associates/aggregates of these molecules.

2. Description of the Related Art

Conventionally, the concept of an optical computer has been proposed, and based on this concept optical computing elements have been proposed. Moreover, optical computers having special functions have been manufactured on a trial basis.

Optical elements used in such optical computers have a structure such that a partially light-shielding mask is placed in front of a thin flat inorganic crystal ($LiNbO_3$, BBO or the like). A signal light beam and a control light beam are input via the mask to the element for optical computation. By changing the light-shielding pattern of this mask, selection can be made from among various computing operations. In the experimentally manufactured optical computers, the computing elements are spatially arranged such that they are basically connected in series. This arrangement has been employed so as to achieve super-high speed computation.

However, since the above-described optical computers are dedicated computers designed to perform special calculations at high speed, they are not suitable for various types of general calculations. Especially, it has been said that such optical computers are not suitable for processing of two-dimensional information including image information. Moreover, since the conventional elements in optical computers use a single crystal, a substance to effect a function of an element is a homogeneous system, so that it is difficult to control transfer of an excited state within the thin-film element.

This restriction also holds true with a system wherein molecules of an organic compound are monomolarcularly dispersed in a matrix of a polymer or the like, and remains unsolved in essence.

SUMMARY OF THE INVENTION

An object of the present invention is to solve the above-mentioned problems involved in conventional optical elements, and to provide an optical computer which includes a plurality of thin-film elements and light sources for transferring two-dimensional-information light between the thin-film elements, thereby making it possible to input and output light beams to and from the plurality of thin-film elements.

In order to attain the above-object, the present invention provides an optical computer which includes a two-dimensional thin-film element having a dispersed material with a light transmittance characteristic changeable by absorbed light radiation of a predetermined wavelength. A first light beam of the first predetermined wavelength is formed with a two-dimensional-information pattern and projected onto the thin-film element to spatially change the light transmittance of the thin-film element in accordance with the two-dimensional-information pattern. A second light beam of a wavelength affected by the changed light transmittance of the thin-film element is directed onto the thin-film element to be spatially modified in accordance with the two-dimensional-information pattern. The spatially modified light beam can be used to spatially change the light transmittance of a second thin-film element, can be modified by one or more further thin-film elements, or can be output as a modified image or two-dimensionally processed information for subsequent use.

Preferably, each of the thin-film elements includes nanoparticles comprising molecules of an organic compound and associates/aggregates of these molecules.

Preferably, the two-dimensional information incident light includes a two-dimensional image.

Preferably, the external signal is signal light, or an electrical or ultrasonic signal assisting the signal light.

Preferably, the thin-film elements are a plurality of different functional elements which are capable of holding the two-dimensional-information incident light for respective periods of time after the two-dimensional-information incident light is shut off, the respective periods of time ranging from the order of femtoseconds to the order of years.

Preferably, the plurality of thin-film elements are disposed and joined with each other such that a plurality of signal light beams are input to each thin-film elements and a plurality of signal light beams are output therefrom.

In this case, at least a single light beam having a wavelength same as or different from that of the two-dimensional-information incident light is preferably irradiated from the outside of the element onto the element such that the light beam is oriented coaxially or at an angle with the two-dimensional-information incident light, whereby the movement of an excited state within the element is controlled from the outside of the element.

DESCRIPTION OF THE PREFERRED EMBODIMENTS

The present invention will now be described in detail. In the following description, it is assumed that input images to be processed in accordance with the method of the present invention include wavelength information (color information) but do not include time information. That is, the information itself does not vary within a period of time during which a single frame of an input image is processed.

Accordingly, the method of the present invention can be applied to processing of moving images only in the case where the period of time required to process a single frame of an input image is shorter than the period of time during which the image varies to provide a next frame.

Embodiments of the present invention will now be described specifically with reference to the drawings.

In order to simplify the following description, it is assumed that input images are monochromatic information (contrast of monochromatic light). However, when information containing color information is processed, such information can be processed by disposing thin-film elements required for color processing. Even in such a case, the operation is basically the same as the operation which will be described below.

First Embodiment

Figure 1:
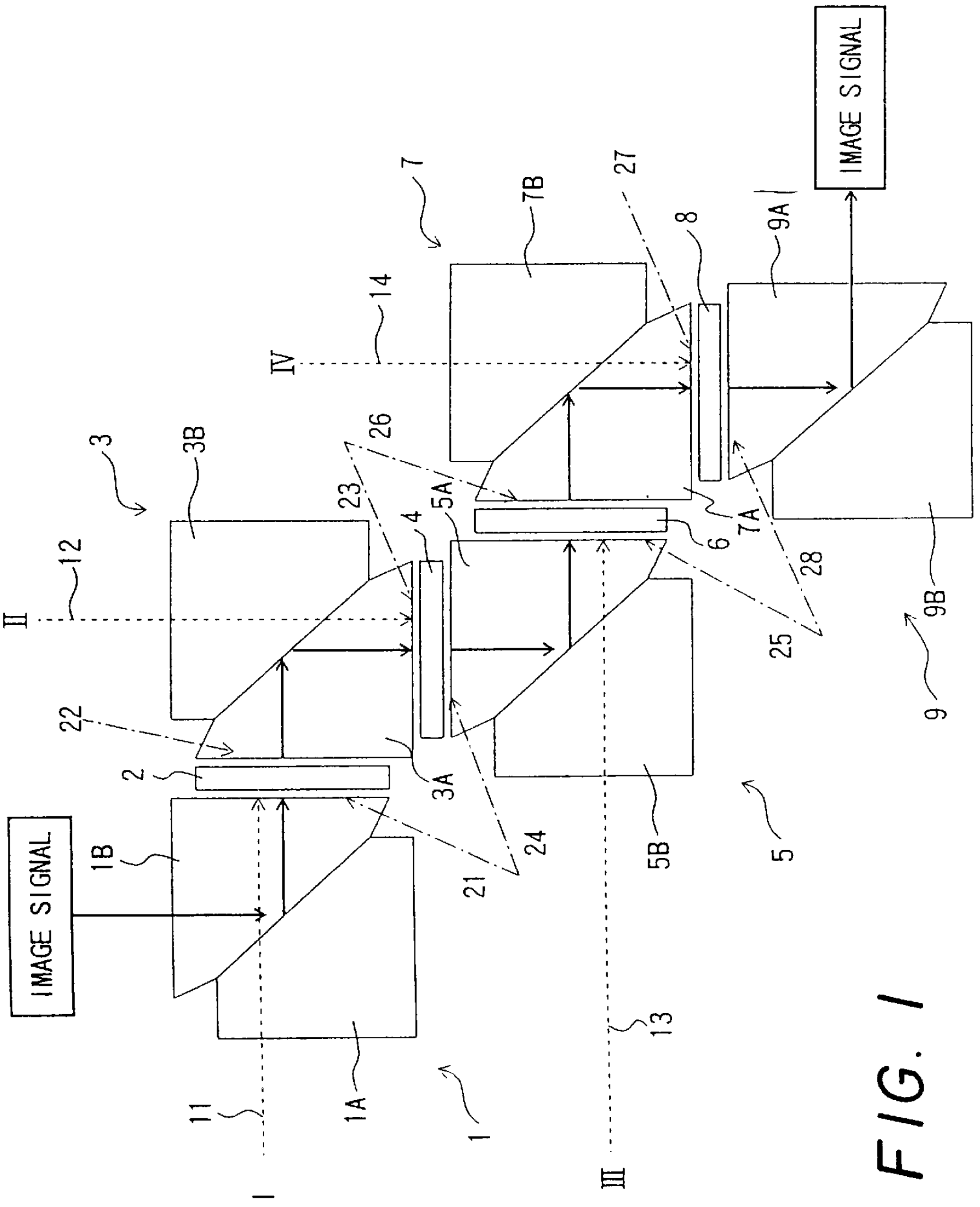
FIG. 1 is a view showing the structure of an optical computer according to a first embodiment of the present invention.
Figure 2:
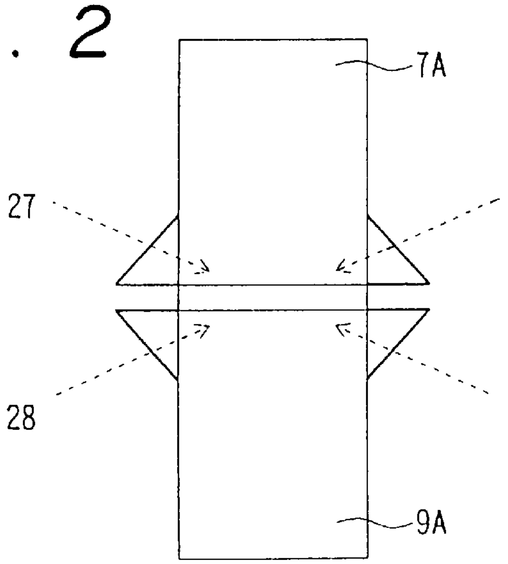
FIG. 2 is a partial side view of the optical computer according to the first embodiment of the present invention.

FIG. 1 is a view showing the structure of an optical computer according to a first embodiment of the present invention, and FIG. 2 is a partial side view of the optical computer shown in FIG. 1.

In FIGS. 1 and 2, each pair of two modified triangular prisms 1A and 1B, 3A and 3B, 5A and 5B, 7A and 7B, and 9A and 9B is assembled by joining the respective modified triangular prisms with each other through application of an adhesive having a refractive index close to that of one of the prisms, so that modified quadrangular prisms 1, 3, 5, 7, and 9 are provided to redirect and pass respective orthogonal light beams in a corresponding single direction. Each quadrangular modified prism (hereinafter may be referred to as a "block") is handled as a single structural unit.

Thin-film elements 2, 4, 6, and 8 are respectively provided between the blocks 1 and 3, between the blocks 3 and 5, between the blocks 5 and 7, and between the blocks 7 and 9. Each of the thin-film elements 2, 4, 6, and 8 can be formed by a known method. For example, each thin-film element may be a functional element which includes nanoparticles comprising molecules of an organic compound and associates/aggregates of these molecules and which has a thickness of about 30 $\mu$m (which is obtained by preparing a powder material through use of a solution coprecipitation method and by subjecting the powder material to hot press; see Japanese Patent Application Laid-Open (kokai) No. 6-263885). Alternatively, the thin-film element may be a thin-film element which includes nanoparticles as described above and which has a thickness of about 1 $\mu$m (which is obtained by forming a thin film through use of a vacuum solution coprecipitation method and by subjecting the thin film to a hot forming process; see Japanese Patent Application Laid-Open (kokai) Nos. 6-306181 and 7-252671. Each element has a light absorption characteristic dependent upon its particular molecular compound and which is changeable by absorbed light radiation. The change in transmittance is due to a light-excited, elevated-electron state in the molecular compound. For example, the thin-film 2 element has a maximum-absorption wavelength of 580 nm, and a full width at half maximum (FWHM) of about 40 nm.

Figure 3:
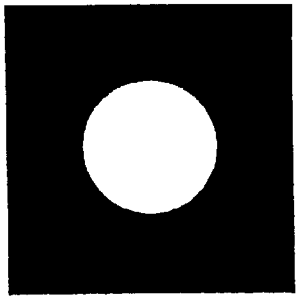
FIG. 3 is an illustration showing a mask pattern.

In order to simplify the analysis, a light beam, after passing through a mask having a pattern (tow-dimensional information) as shown in FIG. 3, is irradiated onto the block 1 as an image signal. That is, the central portion of the image receiving surface of the block 1 is irradiated with a signal light beam having, for example, a wavelength of 580 nm and a power of 20 mW. This light pattern impinges upon the thin-film element 2 and the transmittance of the thin-film element 2 decreases to about 80% within the area which is irradiate with the signal light beam, so that the spacial transmittance of the thin-film element 2 is changed in correspondence to the impinging pattern. A uniform transfer light beam 11 of a wavelength affected by the decreased transmittance may then be spatially modified by the thin-film element 2 to produce an output beam having the pattern as shown in FIG. 4.

Figure 4:
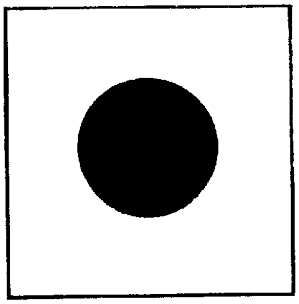
FIG. 4 is an illustration showing the transmission pattern of the mask pattern shown in FIG. 3.

When a transfer light beam 11 from a light source 1 having a wavelength affected by the decrease in transmittance is irradiated onto the thin-film element 2, light pattern shown in FIG. 4 is impinged upon onto the thin-film element 4 which has an absorption characteristic changeable by the light in beam 11 to spatially change the transmittance of the thin-film element 4 in accordance with the impinging two-dimensional pattern. Similarly, when transfer light beams 12, 13, and 14 from respective light sources II, III, and IV having corresponding wavelengths affected by changed transmittance of the thin-film elements 4, 6 and 8 are respectively irradiated onto the thin-film elements 4, 6, and 8, the transmitted light patterns change the transmittance of the thin film elements 6 and 8 and produce an output beam in accordance with the impinging light patterns.

Figure 5:
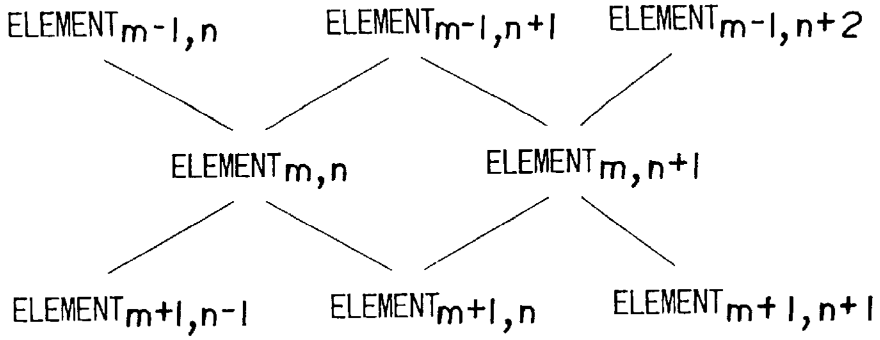
FIG. 5 is an explanatory diagram showing a combination of elements according to the present invention which has two inputs and two outputs.

In this way, an image on an n-th thin-film element is transferred to an (n+1)-th thin-film element as a reverse image. The transfer speed at this time depends on the period of time between the point in time when a transfer light beam is irradiated onto the n-th thin-film element and the point in time when a transfer light beam is irradiated onto the (n+1)-th thin-film element. Also, the slowest limit depends on the life of an excited state of an organic compound used in each thin-film element. In the present embodiment, the thin-film elements are arranged in series for facilitating the understanding. However, since each block has four faces, as shown in FIG. 1, the elements may be arranged so as to receive two input light beams and to output two output light beams, as shown in FIG. 5.

Figure 6:
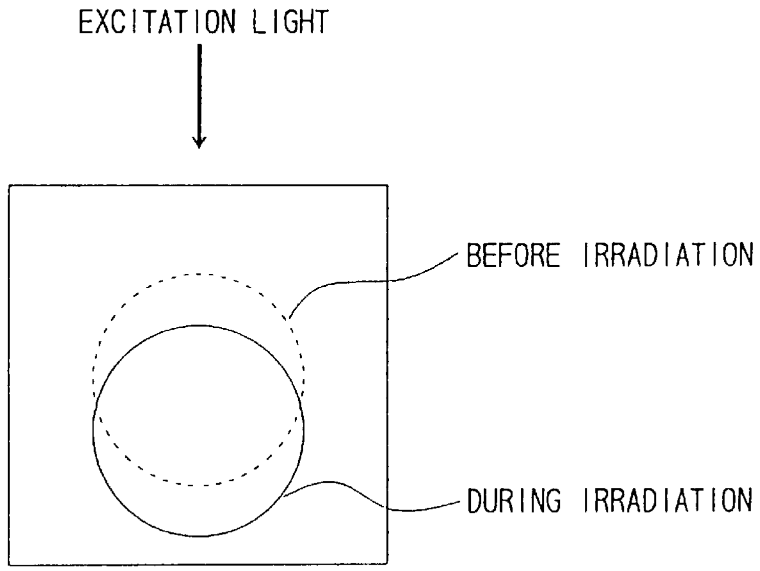
FIG. 6 is an illustration showing a state in which an image was moved with respect to the irradiation direction by irradiating an excitation light beam onto a cut-away portion of a modified triangular prism.

When excitation light beams 25 and 26 are irradiated onto cut-away portions of the above-described modified triangular prisms, an image projected on the n-th thin-film element can be moved in the direction perpendicular to the direction of the projection. When the second harmonic of a Forsterite laser, which was excited by a YAG laser and which had a wavelength of 630 nm and an energy of 7 mJ/pulse, was converged by using a cylindrical lens and was irradiated, a movement of about 10 $\mu$m as shown in FIG. 6 was observed through microscopic observation. In FIGS. 1 and 2, numerals 21, 22, 23, 24, 27, and 28 denote excitation light beams. These excitation light beams 21, 22, 23, 24, 27, and 28 are irradiated onto the respective prisms through the prism coupling surfaces (grading coupling surfaces) provided on the respective prisms.

Second Embodiment

Figure 7:
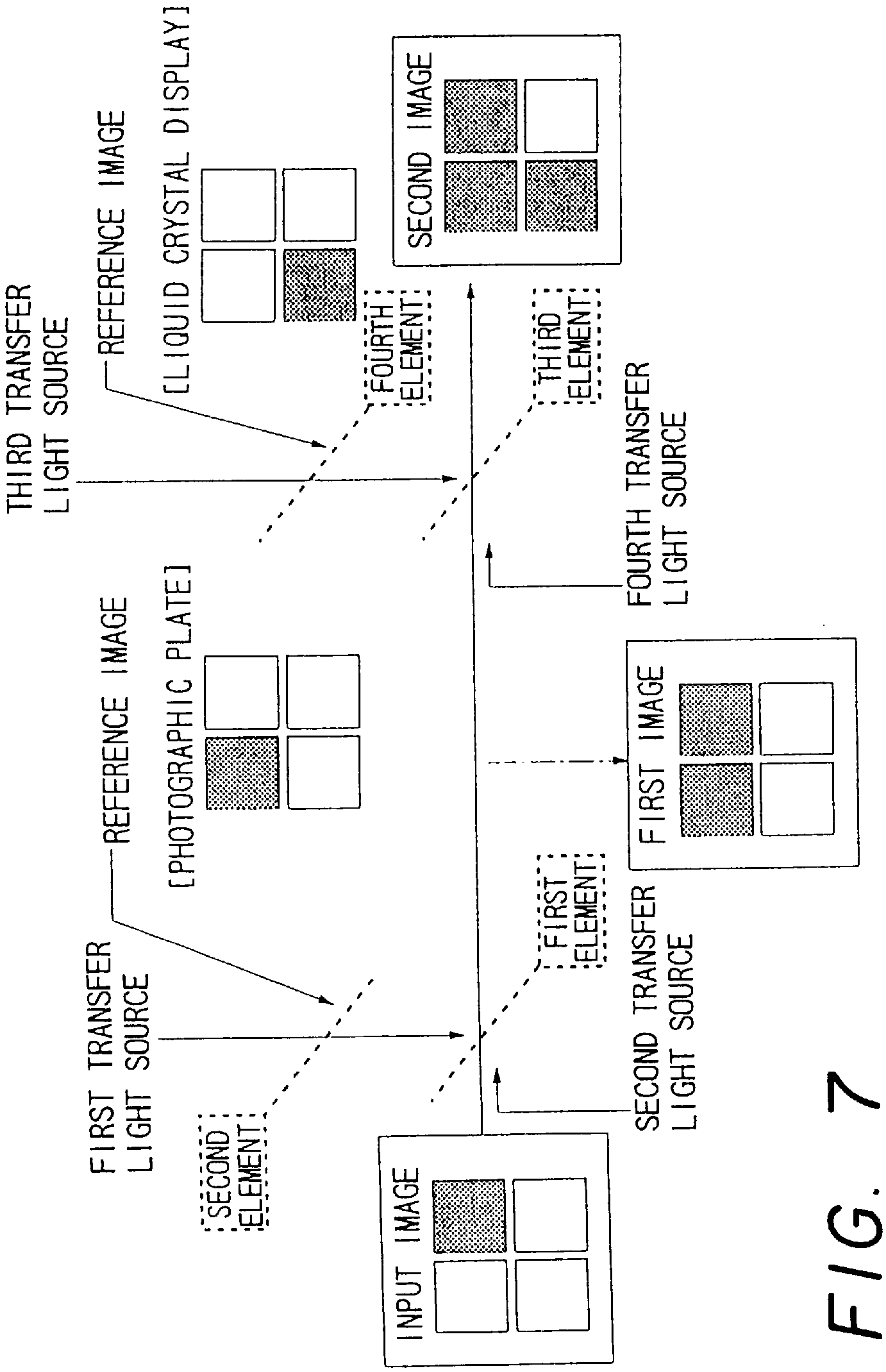
FIG. 7 is a view showing the structure of an optical computer according to a second embodiment of the present invention.

In the second embodiment as shown in FIG. 7, each element, which is explained in the first embodiment and is composed of modified triangular prisms joined to form a modified quadrangular prism together with the respective thin-film elements, is shown as an angled flat plate so as to facilitate the description of its function and to make it easier to view the drawing. However, its complete structure is described in the first embodiment.

As shown in FIG. 7, an image input to a first element is spatially modified by a reference image, which is recorded on a photographic plate and which is transferred from a second element to the first element, so that a first image is output from the first element. The second element or the reference image can hold recorded information for over one year, and can be replaced when the need arises.

The first image is then further modified by a third element in accordance with a reference image, which is displayed on a liquid crystal display and which is transferred from a fourth element to the third element, so that a second or output image is output from the third element. This reference image in the fourth element can be changed at a response speed of about a few milliseconds, and therefore functions as a converter for converting electronically recorded information into optical information.

In terms of storage, the second element permanently stores a stationary image, while the fourth element stores information, such as a moving image, from the liquid crystal display which varies from moment to moment.

When the response time of each element is ignored, the period of time required to modify the input image passing through the first and third elements to obtain the second image is equal to the largest of the following two periods: the first period is the time period for the image on the second element is to be transferred to the first element through use of the first transfer light source to produce the first image and the second period is between is the time for the image on the fourth element to be transferred to the third element through use of the third transfer light source.

Third Embodiment

A third embodiment of the present invention will now be described.

Figure 8:
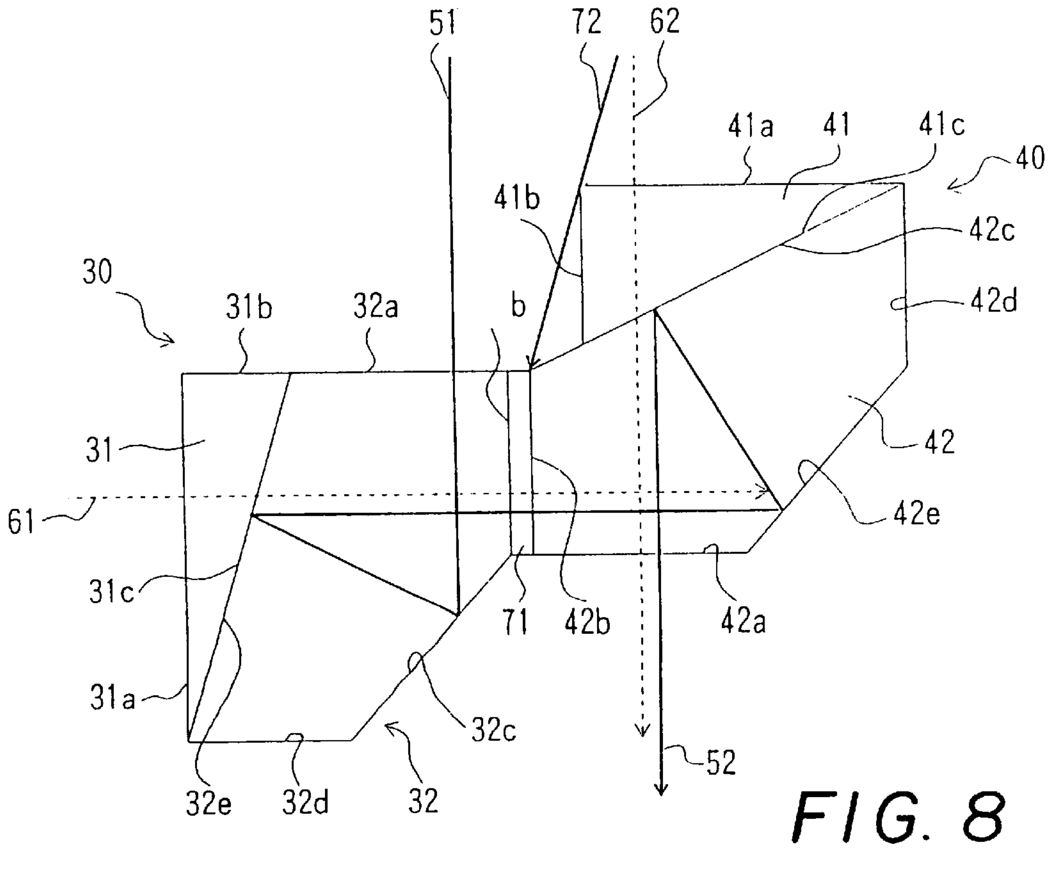
FIG. 8 is a view showing the structure of an optical computer according to a third embodiment of the present invention.

FIG. 8 shows the structure of an optical computer according to a third embodiment of the present invention.

In the present embodiment, there are combined pentagonal prisms, each of which is composed of a triangular prism and a pentagonal prism, taking into consideration the reflection and polarization characteristics at the joint surface between the two prisms.

In detail, there is provided a pentagonal prism 30 which is composed of a triangular prism 31 having faces 31*a,* 31*b,* and 31*c* and a pentagonal prism 32 having faces 32*a,* 32*b,* 32*c,* 32*d,* and 32*e;* and there is also provided a pentagonal prism 40 which is composed of a triangular prism 41 having faces 41*a,* 41*b,* and 41*c* and a pentagonal prism 42 having faces 42*a,* 42*b,* 42*c,* 42*d,* and 42*e.* These pentagonal prisms 30 and 40 are disposed such that the face 32*b* of the prism 30 and the face 42*b* of the prism 40 face each other, and a thin-film element 71 serving as a functional element is disposed between the two faces.

Two-dimensional-information incident light 51 is input through the face 32*a* of the pentagonal prism 30. The light beam 51 is reflected by the faces 32*c* and 32*e* and is output from the face 32*b,* so that the thus-output light beam acts on the thin-film element 71 serving as a functional element. At this time, a transfer light beam 61 is input into the triangular prism 31 via the face 31*a* thereof, so that the transfer light beam 61 acts on the thin-film element 71 together with the two-dimensional-information incident light 51. Also, an excitation light beam 72 is caused to act on the thin-film element.

The two-dimensional information light beam output from the thin-film element 71 is reflected by the reflection faces 42*e* and 42*c* of the pentagonal prism 52, so that an output light beam 52, together with a transfer light beam 62 input from the face 41*a* of the triangular prism 41, is output from the face 42*a* of the pentagonal prism 42.

There exists no essential difference between the present embodiment and the first embodiment, except the difference in their reflectivities and polarization maintaining properties.

As described above, in the present invention, there are disposed a plurality of thin-film elements, each of which causes an external signal to act on a two-dimensional-information incident light so as to perform information processing, and light sources are also provided so as to transfer the two-dimensional-information incident light between the functional elements. This structure makes it possible to input and output light beams to and from the plurality of thin-film elements, so that optical computation can executed through use of an optical computer having a simple structure.

The present invention is not limited to the above-described embodiments. Numerous modifications and variations of the present invention are possible in light of the spirit of the present invention and they are not excluded from the scope of the present invention.

What is claimed is:

1. An optical computer suitable for processing two-dimensional information comprising:

a two-dimensional thin-film element including a dispersed material having a light transmittance characteristic changeable by absorbed light radiation of a predetermined wavelength;

a first light source of the predetermined wavelength;

means for forming a first light beam from the first light source into a two-dimensional-information pattern and for directing the patterned first light beam onto the thin-film element to change the light transmittance of the thin-film element in correspondence with the two-dimensional-information pattern;

a second light source of a wavelength affected by the changed light transmittance of the thin-film element;

means for directing a second beam of the second light source onto the thin-film element to form a third light beam having an output two-dimensional pattern modified in accordance with the two-dimensional-information pattern; and means for irradiating said thin-film element, when excited by said first light beam, with a fourth beam of a wavelength and direction to laterally shift one or more regions of the stable light-excited, elevated-electron state in said thin-film element.

2. An optical computer according to claim 1 wherein said means for directing the second beam of the second light source onto the thin-film element includes means for forming the second beam into an input two-dimensional pattern which is modified by the two-dimensional-information pattern into the output two-dimensional pattern.

3. An optical computer according to claim 2 wherein said input two-dimensional pattern is a two-dimensional image.

4. An optical computer according to claim 1 wherein said dispersed material in said thin-film element includes nanoparticles comprising aggregates of molecules of an organic compound having a stable light-excited, elevated-electron state producing a changed light transmittance.

5. An optical computer suitable for processing two-dimensional information comprising:

first and second two-dimensional thin-film elements each including a dispersed material having a light transmittance characteristic changeable by absorbed light radiation of respective first and second predetermined wavelengths;

said dispersed materials of the first and second thin-film elements, in regions having the changed light transmittance characteristic, affecting transmittance of light radiation of the second predetermined wavelength and a third predetermined wavelength, respectively;

a first light source of the first predetermined wavelength;

means for forming a first light beam from the first light source into a first two-dimensional-information pattern and for directing the patterned first light beam onto the first thin-film element to change the light transmittance of the first thin-film element in correspondence with the two-dimensional-information pattern;

a second light source of the second predetermined wavelength;

transfer means for forming and directing a second light beam from the second light source through the first thin-film element and onto the second thin-film element to change the light transmittance of the second thin-film element in correspondence with a spatial pattern of the second light beam as modified by the spatial transmittance of the first thin-film element;

a third light source of the third predetermined wavelength;

means for forming and directing a third beam of the third light source onto the second thin-film element to form a fourth light beam having an output two-dimensional pattern modified in accordance with the changed light transmittance of the second thin-film elements;

means for irradiating said first thin-film element, when excited by said first light beam, with a fifth beam of a wavelength and direction to laterally shift one or more regions of the stable light-excited, elevated-electron state in said first thin-film element; and means for irradiating said second thin-film element, when excited by said second light beam, with a sixth beam of a wavelength and direction to laterally shift one or more regions of the stable light-excited, elevated-electron state in said second thin-film element.

6. An optical computer suitable for processing two-dimensional information comprising:

first and second two-dimensional thin-film elements each including a dispersed material having a light transmittance characteristic changeable by absorbed light radiation of a first predetermined wavelength;

a first light source of the first predetermined wavelength;

means for forming a first light beam from the first light source into a first two-dimensional-information pattern and for directing the patterned first light beam onto the first thin-film element to change the light transmittance of the first thin-film element in correspondence with the first two-dimensional-information pattern;

a second light source of the first predetermined wavelength;

means for forming a second light beam from the first light source into a second two-dimensional-information pattern and for directing the patterned second light beam onto the second thin-film element to change the light transmittance of the second thin-film element in correspondence with the second two-dimensional-information pattern;

a third light source of a second predetermined wavelength affected by the transmittance change in the first and second thin-film elements;

means for forming and directing a third beam of the third light source through the first and second thin-film elements to form a fourth light beam having an output two-dimensional pattern modified in accordance with the changed light transmittance of the first and second thin-film elements;

means for irradiating said first thin-film element, when excited by said first light beam, with a fifth beam of a wavelength and direction to laterally shift one or more regions of the stable light-excited, elevated-electron state in said first thin-film element; and means for irradiating said second thin-film element, when excited by said second light beam, with a sixth beam of a wavelength and direction to laterally shift one or more regions of the stable light-excited, elevated-electron state in said second thin-film element.

7. An optical computer according to claim 6 wherein said means for forming and directing the third beam of the third light source through the first and second thin-film elements includes means for forming the third beam into an input two-dimensional pattern which is modified by the first and second two-dimensional-information patterns into the output two-dimensional pattern.

8. An optical computer according to claim 7 wherein said input two-dimensional pattern is a two-dimensional image.

* * * * *